United States Patent
Kreuter

(10) Patent No.: US 6,810,851 B2
(45) Date of Patent: Nov. 2, 2004

(54) SUPPLEMENTARY CONTROL VALVE DEVICES FOR AN INTAKE PASSAGE OF AN INTERNAL COMBUSTION ENGINE

(75) Inventor: Peter Kreuter, Aachen (DE)

(73) Assignee: Meta Motoren- und Energie-Technik GmbH (DE)

( * ) Notice: Subject to any disclaimer, the term of this patent is extended or adjusted under 35 U.S.C. 154(b) by 0 days.

(21) Appl. No.: 10/677,689

(22) Filed: Oct. 2, 2003

(65) Prior Publication Data

US 2004/0065298 A1 Apr. 8, 2004

(30) Foreign Application Priority Data

Oct. 2, 2002 (DE) .......................................... 102 46 182

(51) Int. Cl.[7] .............................................. F02D 9/12
(52) U.S. Cl. .................... 123/337; 123/399; 123/184.55
(58) Field of Search ................................ 123/337, 399, 123/184.21, 184.55; 251/129.1

(56) References Cited

U.S. PATENT DOCUMENTS

| | | | | |
|---|---|---|---|---|
| 3,635,438 A | * | 1/1972 | Peters ...................... | 251/129.1 |
| 4,781,161 A | | 11/1988 | Sausner et al. | |
| 4,794,890 A | * | 1/1989 | Richeson, Jr. ............ | 251/129.1 |
| 4,841,923 A | * | 6/1989 | Buchl ...................... | 251/129.1 |
| 4,969,424 A | * | 11/1990 | Klomp ..................... | 251/129.1 |
| 5,584,270 A | | 12/1996 | Dohring | |
| 5,628,287 A | * | 5/1997 | Brackett et al. ....... | 123/184.55 |
| 5,937,821 A | * | 8/1999 | Oda et al. .............. | 123/184.55 |
| 6,352,059 B2 | * | 3/2002 | Stolk et al. ............. | 251/129.1 |
| 6,422,184 B1 | | 7/2002 | Kreuter | |
| 6,502,804 B1 | * | 1/2003 | Schwegler et al. ...... | 251/129.1 |
| 2003/0213930 A1 | * | 11/2003 | Kreuter .................... | 251/129.1 |

* cited by examiner

*Primary Examiner*—Erick Solis
(74) *Attorney, Agent, or Firm*—R W Becker & Associates; R W Becker

(57) ABSTRACT

Supplementary control valve devices (26) may be utilized to control the flow of a fluid within an intake passage (16) of a reciprocating piston internal combustion engine and may include a valve member (56) axially reciprocally disposed within the intake passage and at least partially defining a solenoid armature (60). First and second solenoids (38, 50) are provided on opposite sides of the solenoid armature to reciprocally move the valve member between a valve open position and a valve closed position. Sealing contact faces are preferably defined by pole faces (68, 70) of the second solenoid and a peripheral fluid flow passage (34) extends through apertures (46) defined within the second solenoid and between the sealing contact faces. The valve member closes the peripheral fluid flow passage when pressed against the sealing contact faces. Springs (62, 64) preferably bias the valve member towards a central position between the first and second solenoids.

20 Claims, 2 Drawing Sheets

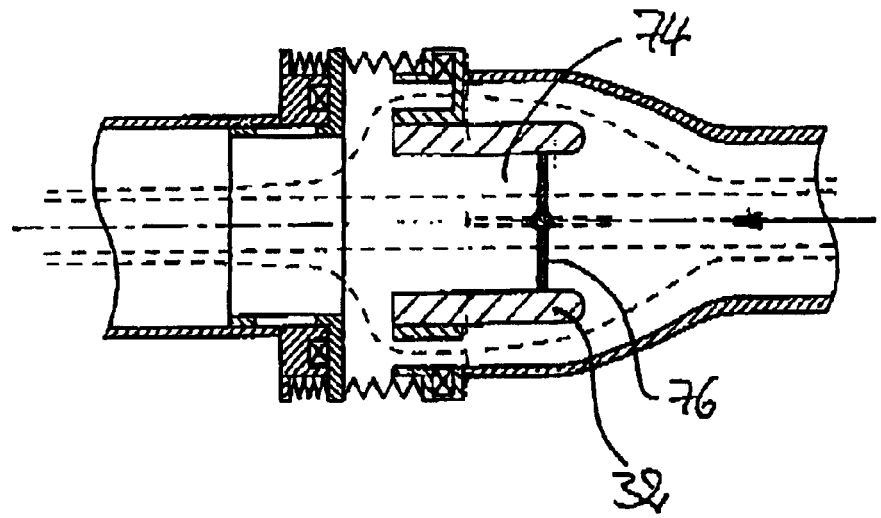
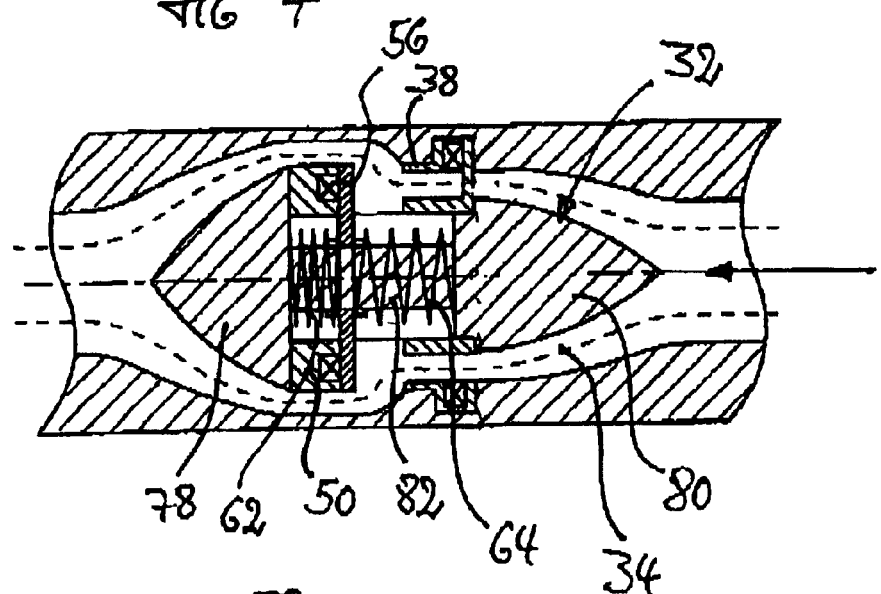
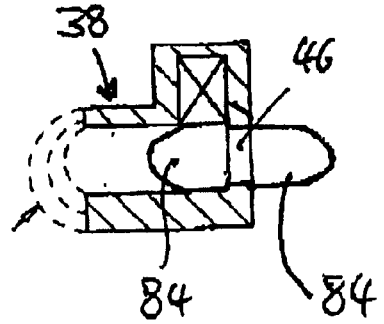

SUPPLEMENTARY CONTROL VALVE DEVICES FOR AN INTAKE PASSAGE OF AN INTERNAL COMBUSTION ENGINE

CROSS-REFERENCE

This application claims priority to German Patent Application No. 102 46 182.1, filed Oct. 2, 2002, the contents of which are incorporated by reference as if fully set forth herein.

1. Technical Field

The present invention relates to supplementary control valve devices that may be disposed within an intake passage of an internal combustion engine comprising one or more reciprocating pistons for controlling the flow of a fluid (e.g., air) through the intake passage.

2. Related Art

Commonly-owned U.S. Pat. No. 6,422,184 discloses a supplementary control valve device disposed in an intake passage of a reciprocating piston internal combustion engine. The supplementary control valve device is utilized to provide impulse charges for the internal combustion engine by closing (sealing) the intake passage during the piston induction stroke (with the conventional cylinder head inlet valve being open). As a result, a reduced pressure is generated within the space between the supplementary control valve and the combustion chamber of the cylinder, because the conventional cylinder head inlet valve is held open during the piston induction stroke. Then, when the supplementary control valve is opened (with the conventional cylinder head inlet valve still being open), the inflowing fresh air charge acquires a high impulse (due to the reduced pressure within the combustion chamber) and the combustion chamber can be more completely filled with fresh air for the next combustion cycle. By utilizing such a supplementary control valve device, an increased amount of torque can be generated by the engine.

U.S. Pat. No. 5,584,270 describes a non-return valve disposed within an intake passage, which valve can be actuated by an outside force. The valve member defines a sealing body having a triangular cross-section and the valve member is movably guided by a holder stem provided in the intake passage. The valve member can be actuated merely by differential pressure or for example by means of a setting device, e.g., a servo motor. The setting device can include a mechanical linkage that projects from the exterior into the intake passage. The valve member also may have a frusto-conical shape and a recess is defined within the flattened tip thereof. The valve member can be actuated by means of a solenoid or a gas spring.

SUMMARY OF THE INVENTION

One object of the present teachings is to provide improved supplementary control valve devices suitable for use in reciprocating piston-type internal combustion engines.

In one aspect of the present teachings, improved supplementary control valve devices may preferably have a relatively simple structure and may be disposed within an intake passage (manifold pipe) that is designed to be coupled to (communicate with) the respective combustion chambers of the engine. Such improved supplementary control valve devices preferably have only a slight influence on air flow resistance, can be actuated relatively quickly and consume relatively little energy, while increasing engine torque output.

In another aspect of the present teachings, supplementary control valve devices may be used, e.g., for impulse charging and/or for Otto-cycle engines, in which operation without a throttle flap is possible. Furthermore, supplementary control valve devices according to the present teachings increase design freedom with regard to other types of induction change control.

Additional objects, features and advantages of the present teachings will be readily understood to a person of ordinary skill in the art after reading the following detailed description of examples and embodiments of the present teachings together with the claims and the accompanying drawings.

BRIEF DESCRIPTION OF THE DRAWINGS

FIG. 6 shows a longitudinal cross-section view of a second representative supplementary control valve device.

FIG. 7 shows a longitudinal cross-section view of a third representative supplementary control valve device.

FIG. 8 shows a longitudinal cross-section view of a second representative closing solenoid, which is modified with respect to the representative closing solenoid shown in FIG. 4.

DETAILED DESCRIPTION OF THE INVENTION

Figure 1:
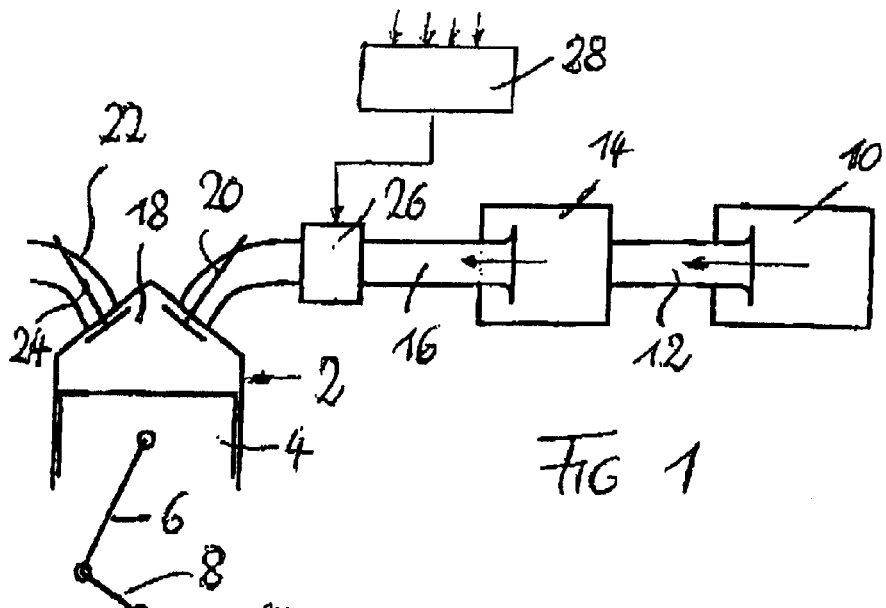
FIG. 1 is an overall, schematic view of an induction (manifold) system and one cylinder of a reciprocating piston internal combustion engine.

In one embodiment of the present teachings, supplementary control valve devices may be disposed within an intake passage (manifold or induction system) of a reciprocating piston internal combustion engine. Such supplementary control valve devices may include a flow body disposed (e.g., fixedly mounted) within the intake passage. A fluid flow passage (e.g., air flow passage) may be defined, e.g., between an outer surface of the flow body and the inner surface of the intake passage. For example, a peripheral air flow passage may be defined substantially around the outer periphery of the flow body and, more preferably, the peripheral air flow passage may have a substantially loop, ring, annular, oval or polygonal shape. The particular shape of the air flow passage is not particularly restricted, although a generally annular shape provides certain advantages, as will be discussed further below.

A valve member may be movably disposed within the intake passage so as to be reciprocally moved in the axial direction of the intake passage. The valve member preferably has a shape that corresponds to the fluid flow passage (e.g., a peripheral air flow passage) defined between the flow body and the inner surface of the intake passage. Thus, the valve member also may have, e.g., a loop, ring, annular, oval or polygonal shape. Again, the shape of the valve member is not particularly limited, although when a generally annular-shaped air flow passage is defined in the intake passage, a generally annular-shaped valve member is preferably utilized.

At least one portion of the valve member may preferably define a solenoid armature. For example, the portion of the valve member that is arranged and constructed to seal and close the air flow passage preferably may be defined as the solenoid armature. Further, the valve member is preferably resiliently biased on opposite sides, so as to normally assume a substantially central position within its reciprocating movement path.

A first (e.g., valve opening) solenoid may be disposed on a first side of the valve member and may be designed to hold the valve member in a valve open position when actuated. A second (e.g., valve closing) solenoid is preferably disposed on second (opposite) side of the valve member and may be designed to hold the valve member in a valve closed position when actuated. Further, when the valve member opens the air flow passage, the second (valve closing) solenoid preferably defines at least a portion of the air flow passage through the second solenoid. The valve member is preferably defined so as to close the portion of the air flow passage defined through the second solenoid. Optionally, a valve seat may be defined on, or adjacent to, the second solenoid and may be arranged and constructed to be sealingly closed by the valve member (e.g., the solenoid armature portion of the valve member).

The closing solenoid may have a substantially U-shaped half-cross-section. Further, mutually facing sides of cylindrical annular walls of the closing solenoid may define inner side walls of the air flow passage. One or more apertures may be defined in a wall portion that connects the cylindrical annular walls and the aperture(s) are preferably designed so that the fluid (e.g., air) can to pass therethrough. The end faces of the annular walls optionally may be designed so as to define sealing contact faces (including, but not limited to, a valve seat) for the valve member.

An excitation coil may be disposed within a recess (e.g., an annular-shaped recess) defined within the second (valve closing) solenoid. The recess may be formed radially within or outside the air flow passage region formed by the second solenoid. Further, the first (valve opening) solenoid may have a substantially annular configuration and the diameter of the first solenoid is preferably substantially equal to the diameter of the second solenoid. In addition, a substantially annular-shaped groove may be defined in the first solenoid so as to open towards the second solenoid and an excitation coil may be disposed in the substantially annular-shaped groove.

In another embodiment, a portion of the opening solenoid may be substantially flush with an inner surface (wall) of the intake passage. In addition, the valve member may include a substantially annular-shaped disk that is arranged and constructed to press against the respective pole faces of the first and second solenoids. A cylindrical wall preferably extends or projects substantially perpendicularly from a radially inner position of the valve member. In addition, one or more openings or apertures may be defined in the cylindrical wall. Furthermore, the cylindrical wall preferably is designed to be axially movably guided along the inside (inner surface) of the intake passage.

In another embodiment, the opening solenoid may be mounted on the flow body and the valve member may be reciprocally movably disposed around the flow body. First and second springs may bias the valve member towards its central position and the first and second springs may be supported on the flow body.

In another embodiment, the flow body may further include a second air flow passage defined along the axial direction of the flow body (e.g., preferably within a central portion of the flow body). The axial air flow passage preferably is designed so as not to be closable by the valve member, but is instead opened and closed by a separate closing member.

In another embodiment of the present teachings, an intake passage may be designed to be coupled to a combustion chamber of a reciprocating piston internal combustion engine for supplying air to the combustion chamber. Means may be provided for defining an air flow passage within the intake passage, which air flow path may be, e.g., defined peripherally around the defining means and within the inner surface of the intake passage. Various structures may be utilized to define the air flow passage within the intake passage and the present teachings are not particularly limited in this respect.

A valve member may be disposed within the intake passage so as to be reciprocally movable along the axial direction of the intake passage. Preferably, at least a portion of the valve member defines an armature. First and second means for magnetically attracting the armature may be provided on opposite sides on opposite sides of the armature. Various solenoid designs and other magnetic field generating devices may be utilized with this aspect of the present teachings.

Preferably, the air fluid flow passage communicates with and extends through an interior portion of the second magnetic field generating means. In addition, the second magnetic field generating means may define sealing contact faces (e.g., a valve seat) that closes the air flow path when the second means causes the valve member to press against the sealing contact faces. Further, the sealing contact faces may be defined directly on the second magnetic field generating means or may be defined adjacent to the air flow passage.

Furthermore, means may be provided for normally biasing the valve member towards an intermediate position between the first and second magnetic field generating means. Springs and other biasing elements may be advantageously utilized to perform this function and the structure of the biasing means is not particularly limited.

In addition, although the air flow path, the armature and the valve seat preferably are substantially annular-shaped in cross-section, various other shapes may be advantageously utilized with the present teachings, including circular, oval, polygonal, etc.

Each of the additional features and teachings disclosed below may be utilized separately or in conjunction with other features and teachings to provide improved supplementary control valves and methods for designing and using such control valves. Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Referring to FIG. 1, a reciprocating piston internal combustion engine may include a plurality of cylinders 2, although only one cylinder 2 is shown in FIG. 1 for the sake of clarity. A piston 4 is reciprocally disposed within each cylinder 2 and is connected via a connecting rod 6 to a crankshaft 8. A supply of fresh air (or a fresh charge) to the cylinder 2 is provided via an air filter 10 that communicates through a supply duct 12 with an intake manifold 14.

A plurality of intake passage(s) (or manifold pipes) 16 extend from the intake manifold 14 in correspondence to the number of cylinders 2 (i.e., generally one intake passage 16 per cylinder 2). The length of the intake passages 16 is preferably selected to provide suitable resonance frequencies for the air flow that will oscillate within the intake passage 16 during operation, as is well known in the art. Each respective intake passage 16 communicates with the combustion chamber 18 of the respective cylinder 2. At least one inlet valve 20 is movably disposed in the port of each manifold pipe or intake passage 16 so as to open and close the combustion chamber 18. At least one outlet valve 24 operates in a second port of the combustion chamber 18 that communicates with an exhaust passage 22. This representative configuration of the induction system with such manifold pipes, inlet valves and outlet valves is advantageous, but the present teachings are not particularly limited in this respect and various induction system designs that are well known in the art may be advantageously utilized with the present teachings.

A supplementary control valve device 26 is preferably provided within the intake passage 16 upstream of the inlet valve 20. A control unit (controller) 28 is preferably designed to control operation of a valve member 56 that is reciprocally disposed in the control valve device 26. Methods for operating a supplementary control valve unit, including methods for obtaining optimal air-fuel mixtures and providing impulse charges, are known in the art, such as from commonly-owned U.S. Pat. No. 6,422,184, and thus need not be described in detail herein.

Figure 2:
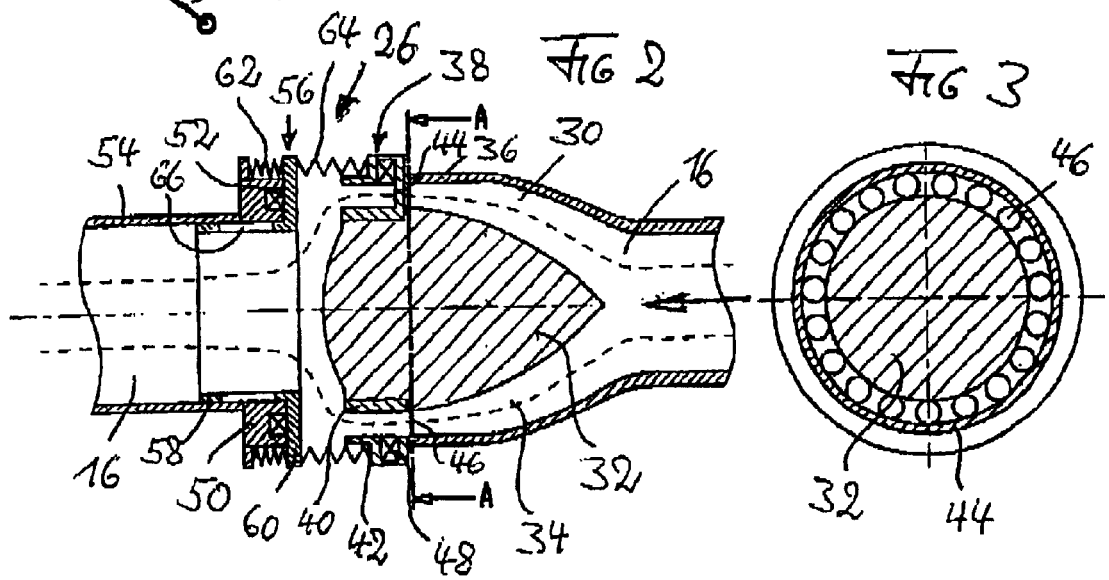
FIG. 2 shows a longitudinal cross-section view of a first representative supplemental control valve device.

FIG. 2 is a longitudinal cross-sectional view through the representative supplementary control valve device 26 shown in FIG. 1. The air or fresh charge flow direction through the representative induction system is indicated by arrows (right to left) in FIGS. 1 and 2.

The intake passage 16 preferably includes an enlarged or bulged portion 30 at the upstream side or end of the supplementary control valve device 26. A flow body 32 may be disposed (e.g., fixedly mounted) within the enlarged portion 30 and may be fixed, e.g., via support arms (not shown), to the inner surface (wall) 36 of the intake passage 16. The shapes of the flow body 32 and the inner surface of the intake passage 16 preferably correspond to each other so that a substantially peripheral air flow passage 34 is defined between the flow body 32 and the inner surface of the intake passage 16. The peripheral air flow passage 34 may have a substantially annular shape in cross-section, although the particular shape of the peripheral air flow passage 34 is not particularly limited according to the present teachings. Further, the cross-sectional area of the peripheral air flow passage 34 slightly decreases along the air flow direction as compared to the air flow passage upstream of the flow body 32, although this aspect of the present teachings also is not particularly limited.

In the representative embodiment shown in FIG. 2, a valve closing (second) solenoid 38 is preferably disposed at a downstream side or end of the flow body 32. The closing solenoid 38 preferably has a shape that substantially corresponds to the peripheral air flow passage 34, and is preferably annular, although other shapes are of course possible. If the inner surface 36 of the intake passage 16 is substantially annular, the closing solenoid 38 may have an overall U-shape in half cross-section.

Figure 3:
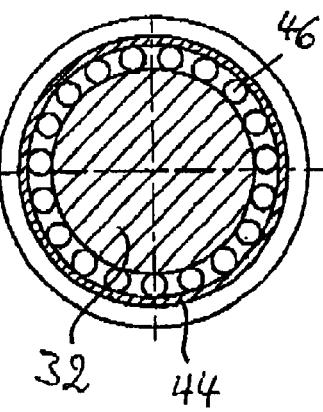
FIG. 3 shows a cross-sectional view of the representative supplementary control valve device taken along the line A—A shown in FIG. 2.
Figure 4:
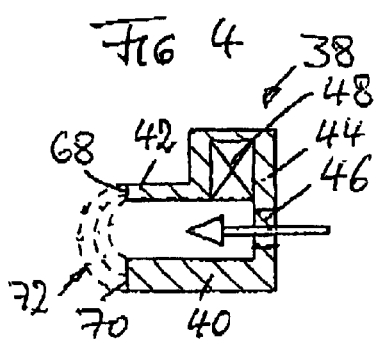
FIG. 4 is a longitudinal cross-section view through a representative closing solenoid.

Referring to FIGS. 2 and 4, the representative closing solenoid 38 is defined, e.g. by two cylindrical (annular-shaped) walls 40 and 42 that are coupled by a radially extending wall portion 44. Referring to FIG. 3, which shows a cross-section along line A—A in FIG. 2, a plurality of apertures 46 preferably are defined within the wall portion 44. Referring to FIG. 2, an excitation coil (solenoid coil) 48 is preferably disposed within a peripherally extending, radially inwardly open recess defined in wall 42. The mutually facing sides of the walls 40, 42 are preferably disposed so as to be substantially flush with the adjacent, outer surface of the flow body 32 and the inner surface 36. However, it is noted that other components may be inserted between these elements.

A valve opening (first) solenoid 50 is preferably disposed on the downstream side of the closing solenoid 38 with a spacing defined between the closing solenoid 38 and the opening solenoid 50. The opening solenoid 50 optionally may have approximately the same inner and outer diameters as the closing solenoid 38. Further, an excitation coil (solenoid coil) 52 is preferably disposed within a groove (e.g., an annular-shaped groove) defined on the side of the opening solenoid 50 that faces the closing solenoid 38. The cylindrical-shaped, inner surface of the opening solenoid 50 preferably extends substantially flush with the inner surface (adjoining wall) 54 of the intake passage 16.

The valve member 56 is reciprocally disposed between the opening solenoid 50 and the closing solenoid 38. According to a particularly preferred aspect of the present teachings, the valve member 56 includes at least one portion (e.g., annular-shaped disk 60) that defines a solenoid armature (i.e., a portion that is influenced by magnetic fields generated by solenoids 38, 50), as will be discussed further below. A cylindrical-shaped (e.g., annular-shaped) wall 58 is preferably disposed at (extends or projects from) the at least one portion (e.g., disk 60) that is influenced by magnetic fields. The wall 58 preferably serves as a guide for reciprocal movement of the valve member 56 along the inner surfaces of the wall 54 and the solenoid 50. FIG. 2 shows the condition in which an excitation current is passed through the excitation coil 52, thereby causing the disk 60 to press against the end (pole) face of the opening solenoid 50. As a result, the peripheral air flow path 34 is opened and air can be communicated to the combustion chamber 18.

Although the valve member 56, disk 60, walls 54, 58, and opening solenoid 50 all preferably have an annular shape (or a substantially annular shape) in the representative embodiments of the present teachings, other shapes are of course possible according to the present teachings. These components may be defined, e.g., as oval shapes or polygonal shapes. Further, it is preferable that these components have complementary shapes so as to permit the valve member 56 to reciprocally move (e.g., slide) along the axial direction of the intake passage 16. Any and all shapes that satisfy this object of the present teachings are, of course, expressly included within the scope of the present teachings.

The annular-shaped disk 60 preferably projects outwardly in the radial direction beyond the opening solenoid 50 and defines a support surface for one or more springs 62 that is (are) spaced around the peripheral or circumferential direction thereof. The spring(s) 62 is (are) preferably disposed between the annular-shaped disk 60 and a shoulder portion of the opening solenoid 50. In addition, one or more springs 64 may be disposed on the opposite side of annular-shaped disk 60 between the annular-shaped disk 60 and a shoulder portion of the closing solenoid 38. The springs 62 and 64 are preferably designed such that, when the solenoids 38, 50 are not excited (i.e., no magnetic field is being generated by either solenoid 38, 50), the valve member 56 is biased to an intermediate or central position between the opening solenoid 50 and the closing solenoid 38.

A representative method for assembling the representative embodiment will now be described. For example, the flow body 32 may be mounted in the portion of the intake passage 16 that opens towards the left in FIG. 2, e.g., by support arms (not shown for the sake of clarity) or directly by the closing solenoid 38, which is affixed to the flow body 32 and the inner surface 36 of the intake passage 16. Further, the opening solenoid 50 may be affixed to the inner surface 54 of the portion of the intake passage 16 that is disposed towards the left in FIG. 2, by inserting the valve member 56 after the springs 62 have been fitted in place. Then, the two flow body portions may be connected together using well-known techniques and preferably at a precisely defined spacing relative to each other. This spacing will determine the reciprocating stroke length (range) of the valve member 56 and the spacing may be provided by a flange (not shown) extending from the inner surface 54, which is affixed to a sleeve or socket (not shown) of the inner surface 36.

A representative method for operating the representative supplementary control valve device 26 will now be described. For example, when the opening solenoid 50 is excited, the valve member 56 (i.e., the annular-shaped disk 60) is pulled by the magnetic field towards the opening solenoid 50 so as to press against the end or pole face(s) of the opening solenoid 50. As a result, the spring(s) 62 is (are) compressed. In this case, the peripheral air flow path 34 (shown by broken lines) is opened and air flows through the aperture(s) 46 and then through the space defined between the annular walls 40 and 42, as shown in enlarged scale in FIG. 4.

When the opening solenoid 50 is deactivated (i.e., the excitation current through coil 52 is stopped or substantially reduced), the valve member 56 is released (pushed away) from the opening solenoid 50 due to the biasing force of the springs 62 and moves towards the right as shown in FIG. 2, thereby compressing the spring(s) 64. As noted above, when excitation current is not being passed through either opening solenoid 50 or closing solenoid 38, the springs 62, 64 preferably bias the valve member 56 so that the annular-shaped disk 60 is disposed at an intermediate or central position between the respective end (pole) faces of the solenoids 38, 50. As long as the annular-shaped disk 60 is not pressed against the end (pole) faces of the closing solenoid 38, fluid (e.g., air) can pass through the supplementary control valve device 26.

When the excitation coil 48 of the closing solenoid 38 is excited (i.e., an excitation current is passed through the coil 48), a magnetic field 72 is formed between the end (pole) faces 68 and 70 (FIG. 4). As a result, the annular-shaped disk 60, due to its function as an armature plate, is pulled towards and presses against the end (pole) faces 68, 70 of the closing solenoid 38. As will be appreciated, the end (pole) faces 68, 70 optionally may define a valve seat so that, in the closed position of the valve member 56, the fluid flow path through the intake passage 16 is interrupted (e.g., sealingly closed). However, the valve seat for the valve member 56 may be defined in another location and the present teachings are not particularly limited in this regard.

Upon de-activation of the excitation coil 48 (i.e., stopping or substantially reducing the excitation current through coil 48), the valve member 56 is released from and moves away from the closing solenoid 38 due to the biasing force of springs 62, 64, thereby opening the fluid flow path 34 again. As will be appreciated, the closing and opening solenoids 38, 50, together with the springs 62 and 64 and valve member 56, form an oscillating or axially reciprocating valve system. Thus, by appropriately activating/deactivating the respective excitation coils 48, 52 of the solenoids 38, 50, the valve member 56 selectively moves to its fully open or its fully closed position. Because energy is stored in the respective springs 62, 64 when compressed, only a relatively small amount of energy (magnetic field) is required to be generated by the respective excitation coils 48, 52 for attracting and holding the valve member 56. Further, the valve member 56 can be precisely and quickly controlled, because the valve member 56 is only required to move a short distance between the valve open and closed positions, which moving distance and time is determined by the natural frequency of the oscillating or reciprocating valve system.

Figure 5:
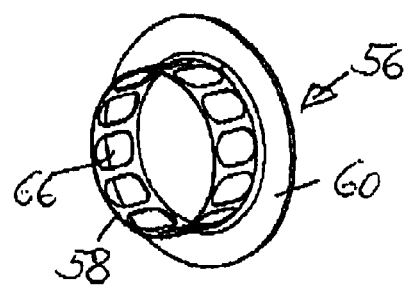
FIG. 5 shows a perspective view of a representative valve member.

FIG. 5 is a perspective view of one representative valve member 56 that includes a plurality of openings 66 defined within the cylinder-shaped wall 58 that projects perpendicularly from the annular-shaped disk 60. The openings 66 may be advantageously utilized in order to enable the valve member 56 to freely move without (or with reduced) impedance or friction. In other words, when the valve member 56 is moved away from the opening solenoid 50 (i.e., away from the position shown in FIG. 2), a space will be defined between the end (pole) faces of the opening solenoid 50 and the annular-shaped disk 60. By utilizing the openings 66 in the wall 58, the valve member 56 can fill with fluid (e.g., air) via the openings 66 so that no reduced pressure or, when the valve member moves into its open position, no increased pressure, occurs as a consequence of the change in volume of the space. An increased or reduced pressure would impede the reciprocating movement of the valve member 56, which of course is not desirable.

Further, by appropriately sizing the openings 66 and matching the openings 66 to the dimensions of the opening solenoid 50, the impact of the valve member 56 against the opening solenoid 50 can be reduced when the valve member 56 is attracted towards the opening solenoid 50. In other words, when the valve member 56 is disposed in the closed position, a reduced pressure is generated during the induction stroke of the internal combustion engine because the inlet valve 20 is open when the piston 8 is moving downwardly. This reduced pressure will serve to draw or pull the annular-shaped disk 60 away from the closing solenoid 38. Therefore, the openings 66 will assist the subsequent movement of the valve member 56 towards the valve open position when the excitation coil 48 is deactivated. On the other hand, when the pressure is increased within the space between the inlet valve 20 and the valve member 56, this increased pressure will further press the annular-shaped disk 60 against the valve seat or pole faces 68, 70 of the closing solenoid 38.

In addition, by removing material from the valve member (i.e., by forming opening(s) 66 in the wall 58), the valve member 56 will have a reduced inertial mass. Consequently, weight of the valve member 56 will be reduced and the valve member 56 can be biased by smaller springs 62, 64 and can be moved with less energy by solenoids 38, 50.

When used for impulse charging to achieve an increased amount of torque at relatively low speeds, the supplementary control valve device 26 remains closed during the induction stroke with the inlet valve 20 open. Thus, when piston 4 is moves downwardly in the combustion chamber 18 with the inlet valve 20 open, a substantial reduced pressure will be generated within the combustion chamber. The supplementary control valve 26 is then opened (while the inlet valve 20 is still open), so that a fresh air charge will flow with a relative high amount of kinetic energy into the combustion chamber 18. The inlet valve 20 is then closed before backflow occurs. As a result of this operation, it is possible to fill the combustion chamber 18 more fully or completely with air, thereby increasing the torque output of the engine due to improved combustion of the fuel/air mixture.

After the fuel/air mixture is combusted within the combustion chamber 18, the supplementary control valve device 26 is closed again and is ready for the next induction cycle. If the system does not include a butterfly throttle flap, the supplementary control valve device 26 may be actuated in conformity with the inlet valve 20 so that only a predetermined relatively small amount of fresh charge passes into the combustion chamber 18 during the induction stroke.

In order to directly seal the space between the separate inner surfaces (walls) 36, 54 of the intake passage 16 in a manner that will minimize fluid flow resistance, the spring 64 may be, e.g., a coil spring or the annular-shaped disk 60 may be, e.g., provided with an additional cylindrical wall (not shown) that is guided along the inner surface of the radially outer annular wall 40 of the closing solenoid 38. It will be appreciated that other structural configurations for the sealing means are possible and the present teachings are not particularly limited in this regard.

In addition to relatively low energy consumption and precise controllability, the representative supplementary control valve device 26 has numerous additional advantages. For example, because the fluid (e.g., air) flows through the intake passage 16 via the closing solenoid 38, the excitation coil 48 can be effectively cooled, which is important because the closing solenoid 38 generally has a higher power requirement than the power requirement of the opening solenoid 50. In addition, the closing solenoid 38 may be designed to have the same diameter as the opening solenoid 50, so that the respective pole faces of the closing and opening solenoids 38, 50 contact directly opposing sides of the annular-shaped disk 60, thereby reducing magnetic field losses. Furthermore, the entire valve member 26 may have a relatively small diameter and the fluid (air) flow is only slightly deflected around the flow body 32, thereby minimizing the fluid flow resistance within the intake passage 16. Moreover, the supplementary control valve device 26 may have an overall compact structure, thereby requiring only a small amount of additional space within the engine compartment.

As a further advantage, the annular-shaped disk 60 may have a relatively small diameter, which will minimize the inertial mass of the valve member 56. In addition, it is possible for only the annular-shaped disk 60 to include a material that is influenced by magnetic fields and the remaining portions of the valve member 56 may be comprised of structurally strong, lightweight material(s).

FIG. 6 shows a second representative supplementary valve device 26 that has been modified with respect to FIG. 2. More specifically, an axially-extending fluid (air) flow passage 74 has been defined within the flow body 32 and the fluid flow passage 74 is closable by a closing member 76. The other components of the valve device 26 shown in FIG. 6 may correspond to the other components shown in FIG. 2 and thus, it is not necessary to identify the remaining components with reference numerals.

The second representative supplementary control valve device 26 provides the advantage of including an additional free flow passage 74 through the flow body 32, which may be utilized when engine operation is not effected using impulse charging. This additional free flow passage 74 may be opened during operation (i.e., when the valve member 56 is in the valve open position) to ensure more complete filling of the combustion chamber 18 during piston stroke induction. Therefore, the engine can be smoothly operated at high engine speeds without impulse charging. An actuator (not shown) may be provided for opening and closing the closing member 76 based upon signals supplied by the control unit 28 in a manner well known in the art. Furthermore, the closing member 76 can utilized to perform the function of a butterfly throttle flap (valve), as is well known in the art.

FIG. 7 shows a third representative supplementary control valve device 26. In contrast to FIG. 2, the flow body 32 of the third representative supplementary control valve device 36 has been separated into an upstream part 80 and a downstream part 78 that are connected by a stem 82. The opening solenoid 50 may be mounted on the downstream part 78. In this embodiment, the valve member 56 is substantially in the form of an annular disk that is movably guided on the stem 82. Springs 62 and 64 are again disposed on each side of the valve member 56 and may advantageously be disposed around the stem 82 so as to bias the valve member 56 towards an intermediate or central position between the closing solenoid 38 and the opening solenoid 50. Further, the diameter of the peripheral fluid flow passage 34 increases downstream of the closing solenoid 38, because the fluid is designed to flow around the outside of the opening solenoid 50, which still may optionally have a diameter that is substantially equal to the diameter of the closing solenoid 38.

The additional embodiments shown in FIGS. 6 and 7 are, of course, only examples of suitable design modifications that are available according to the present teachings. As these examples show, the closing solenoid 38 may be easily designed so that the fluid flowing through the intake passage 16 can flow through the closing solenoid 38 and various magnetic fields may be generated for attracting the armature portion (60) of the valve member 56.

FIG. 8 shows a further representative closing solenoid 38 that has been designed to reduce fluid flow resistance through the apertures 46. For example flow-guide bodies 84 may be provided on each side of the apertures 46, which flow-guide bodies 84 may be made of a material that is not influenced by magnetic fields.

Additional teachings relevant to, and advantageously combinable with the present teachings, are found in, e.g., commonly-owned U.S. Pat. No. 6,422,184, the contents of which are hereby incorporated by reference as if fully set forth herein.

For ease of reference when viewing the accompanying drawings, the following list of elements is provided with their respective reference numerals:

| | |
|---|---|
| 2 | cylinder |
| 4 | piston |
| 6 | connecting rod |
| 8 | crankshaft |
| 10 | air filter |
| 12 | supply duct |
| 14 | manifold |
| 16 | intake passage |
| 18 | combustion chamber |
| 20 | inlet valve |
| 22 | exhaust passage |
| 24 | outlet valve |
| 26 | supplementary control valve device |
| 28 | control unit |
| 30 | enlarged portion |
| 32 | flow body |
| 34 | fluid (air) flow passage |
| 36 | inner surface (annular wall) |
| 38 | closing solenoid |
| 40 | annular wall |
| 42 | annular wall |
| 44 | connecting wall portion |
| 46 | aperture |
| 48 | excitation coil |
| 50 | opening groove |
| 52 | excitation coil |
| 54 | inner surface (wall) |
| 56 | valve member |
| 58 | annular wall |
| 60 | annular disk |
| 62 | spring |
| 64 | spring |
| 66 | opening |
| 68 | pole face |
| 70 | pole face |
| 72 | magnetic field |
| 74 | fluid (air) flow passage |
| 76 | closing member |
| 78 | downstream part |
| 80 | upstream part |
| 82 | stem |
| 84 | flow-guide body |

What is claimed is:

1. An apparatus suitable for controlling a flow of a fluid within an intake passage of a reciprocating piston internal combustion engine, comprising:

a flow body mounted within the intake passage, wherein a fluid flow passage is defined between an inner surface of the intake passage and an outer surface of the flow body, a valve member disposed within the intake passage and being reciprocally movable along the axial direction of the intake passage between a valve open position and a valve closed position, wherein at least a portion of the valve member defines a solenoid armature, a first solenoid disposed on a first side of the solenoid armature and being arranged and constructed to attract the valve member towards the valve open position when the first solenoid is actuated, and a second solenoid disposed on a second, opposite side of the solenoid armature and being arranged and constructed to attract the valve member towards the valve closed position when the second solenoid is actuated, wherein a portion of the fluid flow passage is defined through the second solenoid and the valve member is arranged and constructed to sealingly close the fluid flow passage when disposed on the valve closed position, and wherein the valve member is normally biased towards a central position between the first and second solenoid.

2. An apparatus as in claim 1, wherein the valve member is a substantially annular-shaped and the fluid flow path is a peripheral fluid flow path having a substantially annular cross-section.

3. An apparatus as in claim 2, wherein the second solenoid has an overall U-shape in half-cross-section, and comprises:

substantially cylindrical-shaped walls having mutually facing sides that define side wall portions of the fluid flow passage, and a wall portion connecting the cylindrical-shaped walls, wherein at least one aperture is defined within the wall portion for permitting the fluid to pass therethrough.

4. An apparatus as in claim 3, wherein end faces of the substantially cylindrical-shaped walls define sealing contact faces arranged and constructed to contact the valve member.

5. An apparatus as in claim 4, wherein the second solenoid comprises an excitation coil disposed within a substantially annular-shaped recess.

6. An apparatus as in claim 5, wherein the first solenoid has a substantially annular configuration and the first solenoid has a diameter that is substantially equal to the diameter of the second solenoid.

7. An apparatus as in claim 6, further comprising a substantially annular-shaped groove defined within the first solenoid, which groove opens towards the second solenoid and wherein an excitation coil is disposed within the groove.

8. An apparatus as in claim 7, wherein the first solenoid is coupled to a wall of the intake passage, the substantially annular-shaped valve member is arranged and constructed to reciprocally press against pole faces of the first and second solenoid, the valve member further comprising a cylindrical-shaped portion disposed adjacent to the substantially annular disk, which cylindrical-shaped portion is arranged and constructed to axially slide along the inner surface of the intake passage, and wherein at least one opening is defined within the cylindrical-shaped portion.

9. An apparatus as in claim 7, wherein the first solenoid is mounted to the flow body and wherein first and second springs are supported on the flow body and bias the valve member towards the central position.

10. An apparatus as in claim 6, wherein an axially-extending fluid flow passage is defined within the flow body, which axially-extending fluid flow passage is not closable by the valve member, but is closable by a separate closing member.

11. An apparatus as in claim 1, wherein the second solenoid has an overall U-shape in half-cross-section, and comprises:

substantially cylindrical-shaped walls having mutually facing sides that define side wall portions of the fluid flow passage, and a wall portion connecting the cylindrical-shaped walls, wherein at least one aperture is defined within the wall portion for permitting the fluid to pass therethrough.

12. An apparatus as in claim 11, wherein end faces of the substantially cylindrical-shaped walls define sealing contact faces arranged and constructed to contact the valve member.

13. An apparatus as in claim 1, wherein the second solenoid comprises an excitation coil disposed within a substantially annular-shaped recess.

14. An apparatus as in claim 1, wherein the first solenoid has a substantially annular configuration and the first solenoid has a diameter that is substantially equal to the diameter of the second solenoid.

15. An apparatus as in claim 1, further comprising a substantially annular-shaped groove defined within the first solenoid, which groove opens towards the second solenoid and wherein an excitation coil is disposed within the groove.

16. An apparatus as in claim 1, wherein the first solenoid is couple to a wall of the intake passage, the solenoid armature is arranged and constructed to reciprocally press against pole faces of the first and second solenoid, the valve member further comprises a cylindrical-shaped portion disposed adjacent to the solenoid armature, which cylindrical-shaped portion is arranged and constructed to axially slide along the inner surface of the intake passage, and wherein at least one opening is defined within the cylindrical-shaped portion.

17. An apparatus as in claim 1, wherein the first solenoid is mounted to the flow body and wherein first and second springs are supported on the flow body and bias the valve member towards the central position.

18. An apparatus as in claim 1, wherein an axially-extending fluid flow passage is defined within the flow body, which axially-extending fluid flow passage is not closable by the valve member, and further comprising a separate closing member arranged and constructed to open and close the axially-extending fluid flow passage.

19. An apparatus comprising:

an intake passage arranged and constructed to be coupled to a combustion chamber of a reciprocating piston internal combustion engine, means for defining a peripheral fluid flow passage within the intake passage, a valve member disposed within the intake passage and being reciprocally movable along the axial direction of the intake passage, wherein at least a portion of the valve member defines an armature, first means for magnetically attracting the armature, second means for magnetically attracting the armature, the first and second means being disposed on opposite sides of the armature, wherein the peripheral fluid flow passage communicates with and extends through the second means and the second means defines a valve seat that closes the peripheral fluid flow path when the second means causes the valve member to press against the valve seat, and means for normally biasing the valve member towards a position between the first and second means.

20. An apparatus as in claim 19, wherein the peripheral fluid flow path, the armature and the valve seat are substantially annular-shaped in cross-section.

* * * * *